US009643172B2

(12) United States Patent
Dai et al.

(10) Patent No.: US 9,643,172 B2
(45) Date of Patent: May 9, 2017

(54) METAL LOADED CATALYST AND PREPARATION METHOD THEREOF

(71) Applicants: Wei Dai, Beijing (CN); Jing Peng, Beijing (CN); Haibo Yu, Beijing (CN); Hui Peng, Beijing (CN); Genshuan Wei, Beijing (CN); Maolin Zhai, Beijing (CN); Zuwang Mao, Beijing (CN); Yi Le, Beijing (CN); Wei Mu, Beijing (CN); Haijiang Liu, Beijing (CN); Yunxian Zhu, Beijing (CN)

(72) Inventors: Wei Dai, Beijing (CN); Jing Peng, Beijing (CN); Haibo Yu, Beijing (CN); Hui Peng, Beijing (CN); Genshuan Wei, Beijing (CN); Maolin Zhai, Beijing (CN); Zuwang Mao, Beijing (CN); Yi Le, Beijing (CN); Wei Mu, Beijing (CN); Haijiang Liu, Beijing (CN); Yunxian Zhu, Beijing (CN)

(73) Assignees: China Petroleum & Chemical Corporation, Beijing (CN); Beijing Research Institute of Chemical Industry, Beijing (CN)

( * ) Notice: Subject to any disclaimer, the term of this patent is extended or adjusted under 35 U.S.C. 154(b) by 0 days.

(21) Appl. No.: 14/885,838

(22) Filed: Oct. 16, 2015

(65) Prior Publication Data
US 2016/0136635 A1 May 19, 2016

Related U.S. Application Data

(62) Division of application No. 13/131,226, filed as application No. PCT/CN2009/001332 on Nov. 26, 2009, now abandoned.

(30) Foreign Application Priority Data

Nov. 26, 2008 (CN) .......................... 2008 1 0227414
Apr. 17, 2009 (CN) .......................... 2009 1 0082421
Apr. 29, 2009 (CN) .......................... 2009 1 0083212

(51) Int. Cl.
*B01J 37/34* (2006.01)
*B01J 23/38* (2006.01)
(Continued)

(52) U.S. Cl.
CPC ............ *B01J 37/344* (2013.01); *B01J 23/38* (2013.01); *B01J 23/40* (2013.01); *B01J 23/44* (2013.01);
(Continued)

(58) Field of Classification Search
None
See application file for complete search history.

(56) References Cited

U.S. PATENT DOCUMENTS

| 4,745,094 A * | 5/1988 | Belloni Cofler ......... B01J 13/00 204/157.44 |
| 2002/0072577 A1* | 6/2002 | Jacobsen ................. C08F 10/00 526/129 |
| 2004/0236121 A1* | 11/2004 | Chen ..................... C07C 67/055 549/326 |

FOREIGN PATENT DOCUMENTS

| CN | 1511634 A | 7/2004 |
| CN | 1579618 A | 2/2005 |
| FR | 2763260 A1 | 11/1998 |

* cited by examiner

*Primary Examiner* — Melissa Swain
*Assistant Examiner* — Colette Nguyen
(74) *Attorney, Agent, or Firm* — Finnegan, Henderson, Farabow, Garrett & Dunner, LLP

(57) ABSTRACT

A metal loaded catalyst comprises a support and main active metal components and optional auxiliary active metal components, wherein the main active metal components are elementary substances and obtained by ionizing radiation reducing precursors of main active metal components. The (Continued)

catalyst can be widely used in the catalytic reactions of petrochemistry industry with high activity and selectivity. The catalyst can be used directly without being reduced preliminarily by hydrogen.

10 Claims, 2 Drawing Sheets

(51) Int. Cl.
*B01J 23/40* (2006.01)
*B01J 23/44* (2006.01)
*B01J 23/50* (2006.01)
*B01J 23/62* (2006.01)
*B01J 23/644* (2006.01)
*B01J 23/68* (2006.01)
*B01J 23/70* (2006.01)
*B01J 23/89* (2006.01)
*B01J 35/00* (2006.01)
*B01J 37/02* (2006.01)
*B01J 37/16* (2006.01)
*C10G 35/06* (2006.01)
*C10G 45/00* (2006.01)
*C10G 45/04* (2006.01)
*C10G 45/34* (2006.01)
*C10G 45/46* (2006.01)
*C10G 45/60* (2006.01)
*C10G 47/02* (2006.01)
*C10G 47/10* (2006.01)
*C10G 47/12* (2006.01)
*C10G 49/02* (2006.01)
*B01J 37/04* (2006.01)
*B01J 21/04* (2006.01)

(52) U.S. Cl.
CPC ............ *B01J 23/50* (2013.01); *B01J 23/626* (2013.01); *B01J 23/628* (2013.01); *B01J 23/6447* (2013.01); *B01J 23/681* (2013.01); *B01J 23/70* (2013.01); *B01J 23/8926* (2013.01); *B01J 35/006* (2013.01); *B01J 37/0232* (2013.01); *B01J 37/04* (2013.01); *B01J 37/16* (2013.01); *B01J 37/34* (2013.01); *C10G 35/06* (2013.01); *C10G 45/00* (2013.01); *C10G 45/04* (2013.01); *C10G 45/34* (2013.01); *C10G 45/46* (2013.01); *C10G 45/60* (2013.01); *C10G 47/02* (2013.01); *C10G 47/10* (2013.01); *C10G 47/12* (2013.01); *C10G 49/02* (2013.01); *B01J 21/04* (2013.01)

METAL LOADED CATALYST AND PREPARATION METHOD THEREOF

CROSS REFERENCE OF RELATED APPLICATIONS

The present application claims the benefits of Application No. CN 200810227414.2 as filed on Nov. 26, 2008, CN 200910082421.2 as filed on Apr. 17, 2009, and CN 200910083212.X as filed on Apr. 29, 2009, which are incorporated herein by reference in their entirety and for all purposes.

TECHNICAL FIELD

The invention relates to a supported metal catalyst, a method for preparing the same, and use of the same in a reaction for converting an organic compound.

BACKGROUND ART

Catalysts are basis of modern petrochemical industry, and supported metal catalysts, as an important class of catalysts, are widely used in applications such as oil refining, basic chemical feedstock preparation, fine chemicals industry, and the like. For example, $Ni/SiO_2$—$Al_2O_3$ or Pd/molecular sieve catalysts have been used in hydrocracking to produce gasoline and other fuels; $Pt/Al_2O_3$ catalysts have been used in the catalytic reforming of naphtha to prepare high octane number gasoline, arenes and liquefied petroleum gas, and isomerization of light gasoline, alkanes or xylenes; $Ni/Al_2O_3$ catalysts have been used in methanation; $Ag/Al_2O_3$ catalysts have been used in the reaction for preparing ethylene oxide from ethylene; $Pd/Al_2O_3$ catalysts have been used in the selective hydrogenation of olefins, alkynes in pyrolysis gasoline or dienes, etc.

A supported metal catalyst consists typically of a carrier, a primary metal active component and an optional secondary metal active component. The carrier is a framework supporting the active components and also functions to enhance utilization rate of the active components, enhance heat stability of the catalyst, provide active centers, and the like. Commonly used carrier materials include alumina, silica, molecular sieves, active carbon, magnesia, titania, diatomite, and the like. The primary metal active component is generally a metal element with catalytic activity, and typically an element from Group VIII, such as Pd, Pt, Ni, and the like. The secondary metal active component may be used to modify the activity or selectivity of the catalyst, and commonly used secondary metal active components include Cu, Ag, Au, and the like.

Currently, a supported metal catalyst is typically produced by an impregnation-calcination process comprising contacting sufficiently a solution containing a metal active component precursor (typically, a solution of a salt) with a prepared carrier, to support the metal active component precursor on the carrier; and drying and then calcining at a high temperature the carrier having metal active component precursor supported thereon, to decompose the metal active component precursor into corresponding oxides. After loaded in a reactor, so-prepared catalyst is typically subjected to a pre-reduction treatment, i.e., reducing the metal oxides with hydrogen gas to elementary metal prior to use. Problems suffered by such impregnation-calcination processes for the preparation of a catalyst are that the calcination process consumes a large amount of energy, and that the high temperature involved in the process may cause the sintering of the metal active component particles and/or the carrier, resulting in the deterioration of the catalyst performance.

In order to avoid the influence of the sintering phenomenon on the catalyst performance, many of later catalyst preparation methods remove the high temperature calcination step, and use a chemical reduction process conducted at lower reaction temperature instead, along with heating or activating the system with ultrasonic wave, microwave, UV light, plasma, and the like, so that the catalyst performance is improved to some extent.

U.S. Pat. No. 5,968,860 discloses a method for preparing a hydrogenation catalyst useful in the gas phase production of vinyl acetate from ethylene, which method comprises supporting a Pd active component precursor and the like on a carrier and reducing the Pd active component precursor-supported carrier with sodium borohydride, hydrazine or formic acid at room temperature, wherein an ultrasonic wave activating step is included in the preparation. The resultant catalyst sample has a higher selectivity.

Chinese patent application CN 1579618 describes a method for preparing a supported metal catalyst, which method uses microwave radiation as heat source and a polyol as reducing agent and protecting agent, and can be used to rapidly prepare a multi-component supported catalyst having a supporting amount of from 1 wt % to 99 wt % and a particle size of metal particles controllable to 0.5 to 10 nm.

Chinese patent application CN 1511634 describes a method for preparing a catalyst useful in the selective hydrogenation of ethyne to ethylene. The method uses a radio-frequency plasma to activate and decompose a Pd precursor supported on $Al_2O_3$ at mild conditions and then carries out $H_2$ reduction, to give a catalyst characterized by high low-temperature activity and high selectivity.

U.S. Pat. No. 6,268,522 utilizes UV light reduction process to prepare a hydrogenation catalyst. Irradiating a carrier having an active component precursor and a sensitizing agent impregnated thereon with UV light will cause reduction in the surface layer portion so that the active component will be distributed in an eggshell shape, and the shell thickness can be controlled via the conditions, e.g. UV radiation wavelength, radiation power and irradiating time. After extracting the un-reduced active component precursor with a solvent, the resultant sample exhibits good activity and selectivity in the reaction for the gas phase production of vinyl acetate from ethylene.

In the above improved methods, microwave and UV light belong to electromagnetic radiation. Microwave is an electromagnetic wave having a wavelength ranging from 1 to 1000 mm, and it heats a system through rapid turn of polar molecules under the action of high frequency electric field and is a heating method per se. UV light is an electromagnetic wave having a wavelength ranging from 10 to 400 nm, and its photons have an energy range in accordance with that required to excite molecules so that they can be selectively absorbed by the molecules to excite the molecules and cause chemical reactions. Ultrasonic wave is mechanical vibration, and it applies some influence on the performance of a catalyst through the action of vibration energy on the catalyst. Plasma belongs to low-energy, charge-born particles, and it decomposes and activates an active component precursor through complex chemical reactions between the large amount of charge-born particles and the active component precursor. In the above improved methods, the plasma treatment is an activating method replacing for the calcination step, microwave and ultrasonic wave essentially provide heat source to the chemical reduction process, and only UV radiation can cause reduction reaction of the active component precursor. However, since UV light has a poor penetrating ability for a solid, it can act on only the surface layer of the catalyst and can hardly be used in the production of a mass of product. Furthermore, these methods involve complicated operations, and generally require the use of a large amount of compounds as reducing agent, protecting agent or solvent. Taking into account the economic issues involved in the preparation of a mass of a catalyst, it is difficult for these methods to be used in commercial production.

Thus, there is still a need for providing a simple, effective method that can be used to prepare a supported metal catalyst with good activity and selectivity.

SUMMARY OF THE INVENTION

In order to overcome the problems suffered by the known techniques, the inventors have diligently conducted studies. As a result, the inventors have found that it is possible to utilize ionizing radiation reduction process to prepare a supported metal catalyst, and that the resultant catalyst has excellent performance. The present invention has been made on this basis.

An object of the invention is to provide a supported metal catalyst comprising a carrier and supported thereon a primary metal active component and an optional secondary metal active component, wherein the primary metal active component is in elementary state and is formed by reducing a precursor of the primary metal active component by means of ionizing radiation.

Another object of the invention is to provide a method for preparing the supported metal catalyst, comprising reducing a precursor of the primary metal active component by means of ionizing radiation to form the primary metal active component in elementary state supported on the carrier.

Still another object of the invention is to provide use of the catalyst of the invention in a conversion process of an organic compound.

DETAILED DESCRIPTION OF THE PREFERRED EMBODIMENTS

Figure 1:
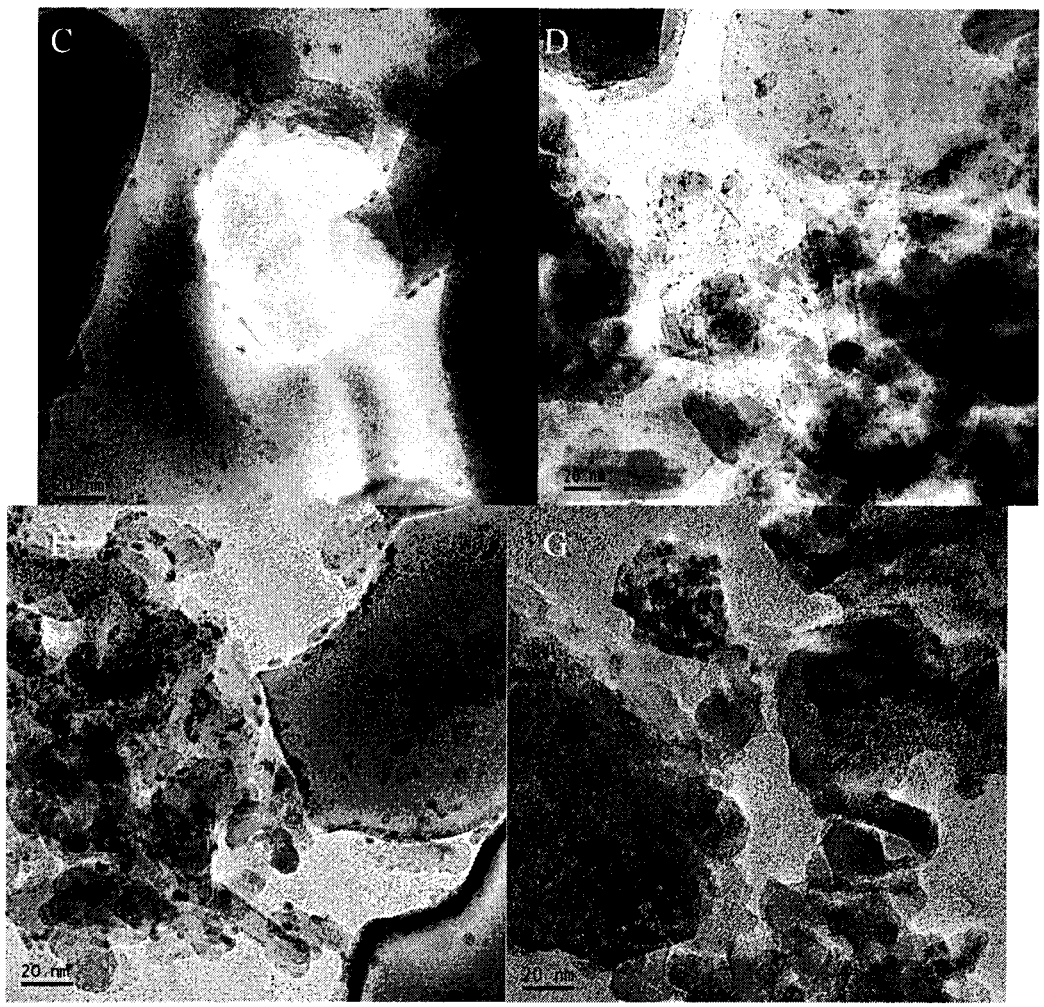
FIG. 1 is transmission electron microscope (TEM) photographs showing the dispersion of Pd particles in catalysts prepared in inventive examples and comparative examples.
Figure 2:
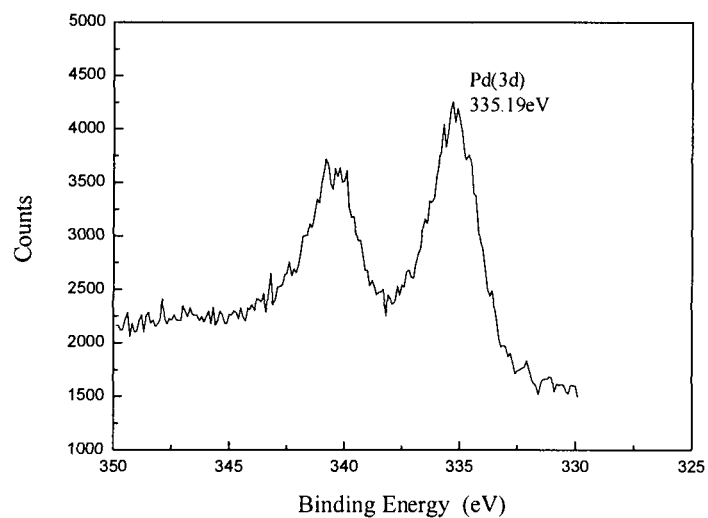
FIG. 2 is the XPS spectrum of the Pd/Al$_2$O$_3$ catalyst from Example 1.
Figure 3:
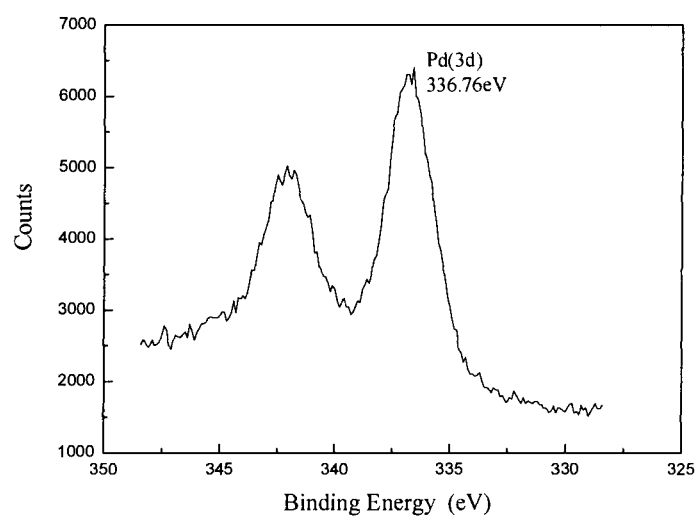
FIG. 3 is the XPS spectrum of a Pd/Al$_2$O$_3$ catalyst prepared though a known technique.

Ionizing radiation is a generic term covering all radiations capable of ionizing a substance, and includes high-energy electromagnetic radiations having a wavelength of less than $10^{-8}$ meter and high-energy particle radiations, such as X-ray, γ-ray, electron beam, high-energy proton, and the like. F-ray is a most commonly used ionizing radiation, and is generally generated by a $^{60}$Co or $^{137}$Cs radiation source. Unlike low-energy electromagnetic radiations such as UV light, ionizing radiation has energy much higher than the exciting energy of molecules so that it can ionize directly molecules, thereby generating a series of active particles and causing reactions such as reduction. In basic studies, reduction reaction caused by ionizing radiation has been used to prepare nanometer elementary metal powder dispersed in a solution system.

The inventors have found that the use of ionizing radiation reduction process in the preparation of a supported metal catalyst has unique advantages: (1) ionizing radiation reduction process can be carried out at normal temperature or low temperature, and the reaction progress can be easily controlled by absorbed dose rate and absorbed dose; (2) γ-ray and electron beam have strong penetrating ability so that they can be used in large-scale preparation; (3) when causing the reduction of the active component precursor to the elementary active component, the energy of the ionizing radiation is also absorbed by the carrier, thereby altering the energy state of the carrier surface, resulting in that the formed elementary active component bonds tightly to the carrier; (4) the operation of ionization irradiating is simple, and the existing large-scale industrial irradiation sources can be used directly in the production of catalysts.

Thus, in the first aspect, the invention provides a supported metal catalyst, comprising a carrier and supported thereon a primary metal active component and an optional secondary metal active component, wherein the primary metal active component is in elementary state and is formed by reducing a precursor of the primary metal active component by means of ionizing radiation.

In an embodiment, the supported metal catalyst of the invention comprises:

a carrier; and supported thereon the following components:

a) a primary metal active component, which is one of the elements of Group VIII and Group IB, in an amount ranging from 0.01 wt % to 20 wt %, based on the total weight of the carrier; and b) an optional secondary metal active component, which is at least one metal chosen from Group VIII elements, Group IB elements, Bi, Sb, In, Cs and Rb, in an amount ranging from 0 wt % to 20 wt %, based on the total weight of the carrier;

if present, the component b) being different from the component a).

The catalyst of the invention comprises a primary metal active component present in its elementary state, which is preferably one member chosen from Group VIII elements and Group IB elements, more preferably from Pd, Pt and Ni, and still more preferably Pd. The content of the primary metal active component ranges from 0.01 wt % to 20 wt %, preferably from 0.01 wt % to 10 wt %, and more preferably from 0.02 wt % to 1 wt %, based on the total weight of the carrier.

The catalyst of the invention comprises optionally a secondary metal active component, which is present in the catalyst in elementary state or in an oxidized state. The secondary metal active component is preferably at least one metal chosen from Group VIII elements, Group IB elements, Bi, Sb, In, Cs and Rb, and more preferably from Ag, Au, Cu, Bi, In, Cs, Rb and Group VIII elements other than the component a). The content of the secondary metal active component ranges from 0 wt % to 20 wt %, and preferably from 0 wt % to 10 wt %, based on the total weight of the carrier.

The catalyst of the invention also comprises optionally other auxiliary agents that are commonly used in hydrogenation catalysts to adjust catalytic performance, such as alkali metal, alkali earth metal, halogen, etc., of which content ranges from 0 wt % to 5 wt %, based on the total weight of the carrier. Information about the combinations of the metal active components and the auxiliary agents in supported metal catalysts has been disclosed in many literatures, such as EP0689872 and US 20040024272, which are incorporated herein by reference.

Preferably, the carrier used in the catalyst of the invention is chosen from $Al_2O_3$, $SiO_2$, $TiO_2$, MgO, diatomite, molecular sieves, clays, and mixtures thereof. Preferably, the carrier is of pellet shape, spherical shape, tablet shape, toothspherical shape, strip shape, or unusual strip shape such as trilobal shape. Preferably, a carrier having a specific surface area of from 1 to 200 $m^2/g$ is used.

In general, the catalyst of the invention has an appearance exhibiting light grey, grey, black, bluish light grey, bluish grey or bluish black.

In the supported metal catalyst of the invention, the primary metal active component in elementary state is formed by reducing a primary metal active component precursor in the presence of the carrier by means of ionizing radiation. More details about the ionizing radiation reduction will be further discussed hereinbelow.

In an embodiment, the catalyst of the invention is ones suitable for the selective hydrogenation of ethyne to ethylene and/or the selective hydrogenation of propyne and propadiene to propylene, comprising:

a carrier, and supported thereon the following components:

a) palladium as primary metal active component present in the form of elementary particles on the surface of the carrier, of which content ranges from 0.01 wt % to 1 wt %, based on the total weight of the carrier, of which average particle size ranges from 1 to 100 nm, and which is formed by ionizing radiation reducing a palladium precursor;

b) an optional secondary metal active component, which is at least one selected from the group consisting of Group VIII metals other than palladium, Group IB metals, Bi, Sb, Pb, In, Cs, Rb, K and Mg, in an amount ranging from 0 to 20 wt %, based on the total weight of the carrier.

In this embodiment, the primary metal active component, palladium, is present on the surface of the carrier, and the thickness of the palladium layer is preferably from 1 to 500 μm. The content of palladium is from 0.01 to 1 wt %, and preferably from 0.01 to 0.4 wt %, based on the total weight of the carrier. The average particle size of palladium is from 1 to 100 nm, preferably from 1 to 40 nm, and more preferably from 1 to 10 nm.

In this embodiment, if present, the secondary metal active component is not specifically limited with respect to its distribution and state. The secondary metal active component may be distributed on the surface of the carrier, or in the carrier; and it can be present in elementary state and/or in oxidized state. The content of the secondary metal active component is from 0 to 20 wt %, preferably from 0 to 5 wt %, and more preferably from 0.001 to 2 wt %, based on the total weight of the carrier. Preferably, the weight ratio of the primary metal active component, palladium, to the secondary metal active component is from 0.01-50.

In a preferred embodiment, the catalyst suitable for the selective hydrogenation of ethyne further comprises other auxiliary agents that are commonly used in hydrogenation catalysts to adjust catalytic performance, such as halogen, in a usual amount.

In another embodiment, the catalyst of the invention is ones suitable for the hydrogenation of an unsaturated hydrocarbon, in particular the hydrogenation of C4 and/or C5 unsaturated hydrocarbon(s), comprising:

a carrier, and supported thereon the following components:

1) elementary Pd as primary metal active component, of which content ranges from 0.01 wt % to 1 wt %, and preferably from 0.01 wt % to 0.8 wt %, based on the total weight of the carrier, and which is formed by ionizing radiation reducing a palladium precursor;

2) at least one chosen from Ag, Cu, Au, Pb, Zn, Bi, Mn and Mo, of which content ranges from 0.01% to 5%, based on the total weight of the carrier; and 3) optionally, at least one chosen from alkali metals and alkali earth metals, and preferably one or two chosen from Li, Na, K, Mg, Ca and Ba, of which content ranges from 0 wt % to 3 wt %, based on the total weight of the carrier.

In this embodiment, the primary metal active component, palladium, is present on the surface of the carrier, and the thickness of the palladium layer is preferably from 1 to 500 μm. The content of palladium is from 0.01 to 1 wt %, preferably from 0.01 to 0.8 wt %, and more preferably from 0.01 to 0.6 wt %, based on the total weight of the carrier. The average particle size of palladium is from 1 to 100 nm, preferably from 0.5 to 40 nm, and more preferably from 1 to 15 nm. The component 2) is generally in a chemical valence state lower than its chemical valence in its normal oxide, and is preferably at least one of Ag, Pb and Cu, and its content ranges from 0.01 wt % to 5%, and preferably from 0.01 wt % to 3 wt %, based on the total weight of the carrier. The component 3) is generally present in the form of metal salt or oxide, and is preferably at least one of K, Na and Ca, and its content in terms of metal ranges from 0 wt % to 3 wt %, and preferably from 0.01 wt % to 2 wt %, based on the total weight of the carrier.

In still another embodiment, the catalyst of the invention is ones suitable for the selective hydrogenation of pyrolysis gasoline, comprising:

a carrier, and supported thereon the following components:

1) elementary palladium as primary metal active component, of which content ranges from 0.01 wt % to 2 wt %, preferably from 0.05 wt % to 1 wt %, and more preferably from 0.05 wt % to 0.5 wt %, based on the total weight of the carrier, and which is formed by ionizing radiation reducing a palladium precursor;

2) optionally, a secondary metal active component, which is at least one chosen from Sn, Pb, Cu, Ga, Zn, Ag, Sb, Mn, Co, Mo, W, Si and P, and preferably Sn and/or Pb, and content of which ranges from 0 wt % to 3 wt %, and more preferably from 0 wt % to 2 wt %, based on the total weight of the carrier; and 3) optionally, at least one of K, Mg, Ca and Ba, and preferably Mg or/and Ca, of which content ranges from 0 w % to 5 wt %, preferably from 0 w % to 3 wt %, and more preferably from 0 wt % to 0.8 wt %, based on the total weight of the carrier.

In the second aspect, the invention provides a method for the preparation of the supported metal catalyst of the invention, comprising applying an ionizing radiation on a system comprising a primary metal active component precursor, a carrier, a free radical scavenger and water, to reduce at least the primary metal active component precursor to the primary metal active component in elementary state.

The step of applying an ionizing radiation to carry out the reduction is conducted in any of the following manners:

a) wetting the carrier having the primary metal active component precursor supported thereon with an aqueous solution comprising the free radical scavenger, and then irradiating the wetted carrier, preferably in vacuum or under inert atmosphere;

b) mixing the carrier having the primary metal active component precursor supported thereon with an aqueous solution comprising the free radical scavenger, and then irradiating the carrier immersed in the solution; and c) mixing the carrier with an aqueous solution comprising the free radical scavenger and the primary metal active component precursor, and then irradiating the carrier immersed in the solution.

In the manners a) and b), the primary metal active component precursor is first supported on the carrier, then the carrier having the primary metal active component precursor supported thereon is combined with an aqueous solution containing the free radical scavenger so that the carrier is wetted with or immerged in the solution, and then the carrier is irradiated with the ionizing radiation. In the manner c), the carrier is directly mixed with an aqueous solution containing the free radical scavenger and the primary metal active component precursor, and then the carrier immersed in the solution is irradiated with the ionizing radiation.

The primary metal active component precursor is a corresponding metal compound of the metal active component, and its examples include, but are not limited to, chlorides, nitrates, acetates, sulfates and organometallic compounds.

In the case where the ionizing radiation reduction is carried out in the above manner a) or b), the primary metal active component precursor may be supported on the carrier by a process commonly used in catalyst preparation, for example, spray coating, incipient-wetness impregnation, over-saturated impregnation, and the like. When an over-saturated impregnation process is used, if the primary metal active component precursor in the impregnation liquid cannot be completely adsorbed by the carrier, then the volume of the impregnation liquid and the concentration of the primary metal active component precursor should be determined according to the adsorption ratio to ensure that the amount of the primary metal active component supported on the carrier meets the predetermined requirement. In the case where the primary metal active component precursor is impregnated onto the carrier, the impregnation may be conducted in one or more steps. Examples of the solvent used during the impregnation including, but are not limited to, water, hydrochloric acid, nitric acid, acetic acid, alcohols, and mixtures thereof; and preferably water. The concentration of the solution used in the supporting operation may vary widely. Preferably, the concentration of the metal active component in the solution ranges from 0.1 mg/ml to 200 mg/ml.

In the case where the primary metal active component precursor is supported onto the carrier, the acidity/basicity of the supported product may influence the subsequent radiation reduction process. In order to make the acidity/basicity of the supported product be in favor of the progress of the radiation reduction, it can be adjusted by using the following methods:

(1) adjusting the pH of the primary metal active component supporting solution to 2-14, and preferably to 2-9, with a solution of, for example, NaOH, KOH, ammonia, sodium carbonate, sodium bicarbonate, or the like; and/or (2) treating the carrier with a fixing agent before loading the primary metal active component precursor; or treating the carrier having the primary metal active component precursor supported thereon with a fixing agent after loading the primary metal active component precursor but before carrying out the radiation reduction, with the fixing agent being a basic compound, and preferably an aqueous solution of NaOH, potassium hydroxide, sodium bicarbonate or sodium carbonate, or ammonia water. The treatment may be conveniently carried out, for example, by spray coating the fixing agent on the carrier with/without the supported primary metal active component precursor. Without limited to a theory, it is believed that the fixing agent converts a soluble metal salt into an insoluble metal compound fixed on the surface of the carrier.

Optionally, but less preferably, prior to the ionizing radiation reduction, the carrier having the primary metal active component precursor supported thereon may be calcined at a high temperature so as to convert the metal active component precursor into oxides.

In the case where the ionizing radiation reduction is carried out in the above-mentioned manner c), it is preferred to treat the carrier with said fixing agent, prior to the radiation reduction. In general, the fixing agent may be combined with the carrier by spray coating.

In the method of the invention, the ionizing radiation reduction is carried out in the presence of an aqueous medium containing the free radical scavenger. Without limited to a theory, it is believed that, when the ionizing radiation acts on the aqueous medium, water is radiolytically decomposed to generate hydrated electron ($e_{aq}^-$), hydrogen atom (.H), hydroxyl free radical (.OH), hydrated hydrogen ion ($H_3O^+$), and the like. Among these, $e_{aq}^-$ is a strong reducing agent and can reduce most of metals in oxidized state to elementary metal. Metal atoms formed through the reduction grow on the surface of the carrier and are finally stabilized by the carrier, thereby forming metal particles having catalytic activity. However, the radiolysis of water generates simultaneously oxidizing free radicals such as .OH, which may re-oxidize the metal atoms just generated in the radiation reduction process. In order to avoid such a side reaction, an amount of the free radical scavenger is included in the irradiated system, and the free radical scavenge reacts with the oxidizing free radicals such as .OH to form a more stable free radical or a reducing free radical, thereby improving the reduction ability of the system.

The free radical scavenger useful in the preparation method according to the invention may be chosen from: C1-C6 alcohols and derivatives thereof, such as ethanol, ethylene glycol, isopropyl alcohol, tert-butyl alcohol, ascorbic acid and formic acid. The free radical scavenger is preferably isopropyl alcohol or ethylene glycol.

Preferably, the reaction medium of the ionizing radiation reduction is a solution of the free radical scavenger in water, which contains from 0.5 vol % to 98 vol %, preferably from 1 vol % to 70 vol %, and more preferably from 2 vol % to 60 vol % of the free radical scavenger.

The ionizing radiation used in the present method may be chosen from γ-ray, X-ray and electron beam. The radiation source may be chosen from $^{60}Co$ (γ source), $^{137}Cs$ (γ source), X-ray source and electron accelerator (electron beam), preferably from $^{60}Co$, X-ray source and electron accelerator, and more preferably $^{60}Co$.

Depending on the composition of the primary metal active component precursor, the acidic/basic condition of the carrier surface and the irradiation conditions, the absorbed dose required to reduce completely the primary metal active component precursor may vary from 0.01 to $1 \times 10^5$ kGy, and preferably from 5 to 100 kGy. A person skilled in the art can readily determine the suitable dose required to reduce completely the primary metal active component.

The absorbed dose rate of the ionizing radiation may vary from 1 to $1 \times 10^7$ Gy/min, preferably from 10 to 10000 Gy/min, and more preferably from 20 to 100 Gy/min.

The ionizing radiation reduction process may be carried out at room temperature or a lower temperature, and preferably at room temperature.

If desired, the secondary metal active component or its precursor may be supported on the carrier before, during or after the ionizing radiation reduction. In an embodiment, the secondary metal active component or its precursor and the primary metal active component precursor are supported, simultaneously or successively, on the carrier by, for example, spray coating process or impregnating process, and then the ionizing radiation reduction is carried out. In another embodiment, the carrier is mixed with an aqueous solution containing the secondary metal active component or its precursor, the free radical scavenger, and the primary metal active component precursor, and then the resultant mixture is irradiated with the ionizing radiation, to obtain the catalyst comprising the primary metal active component and the secondary metal active component. In another embodiment, after the ionizing radiation reduction step, the secondary metal active component is supported on the carrier having the primary metal active component supported thereon by, for example, spray coating process or impregnating process. The timing for supporting the secondary metal active component or its precursor may be selected according to the desired form of the secondary metal active component and considering the simplicity of the preparation method, and this is within the knowledge of a person skilled in the art. The preferences given when discussing the supporting of the primary metal active component precursor are applicable similarly to the secondary metal active component or its precursor.

If desired, other auxiliary agents used to adjust the catalytic performance, such as halogen, may be supported on the carrier before, during or after the ionizing radiation reduction. The timing and manner for supporting the auxiliary agents may be readily determined by a person skilled in the art.

In the method of the invention, the carrier having subjected to the ionizing radiation reduction or the carrier having subjected to the ionizing radiation reduction and the further supporting of the secondary metal active component and/or the other auxiliary agents is washed with a suitable amount of de-ionized water and then dried, or directly dried without the washing, to give the catalyst of the invention. The drying may be carried out under air atmosphere or under vacuum, and preferably under air atmosphere. The temperature for the drying may ranges from 40 to 200° C., and preferably from 50 to 120° C. The drying time may ranges from 3 to 48 hours, and preferably from 5 to 24 hours.

In the third aspect, the invention relates to the use of the present catalyst in an organic compound conversion reaction. The organic compound conversion reactions include, but are not limited to, selective hydrogenation of ethyne in an ethylene stream to ethylene; selective hydrogenation of propyne and propadiene in a propylene stream to propylene; hydrogenation of an unsaturated hydrocarbon, especially hydrogenation of C4 and/or C5 unsaturated hydrocarbon; selective hydrogenation of alkynes in a pyrolysis gasoline; catalytic reforming; hydrocracking; and isomerization.

The supported metal catalyst and the preparation method thereof according to the invention have the following advantages:

(1) the catalyst of the invention has a primary metal active component in metal elementary state so that the catalyst can be used directly, without needing the reduction with hydrogen gas prior to use;

(2) in contrast to the catalysts prepared through a calcination decomposition process, the catalyst of the invention is prepared at a normal temperature so that the high-temperature sintering of active component particles and/or carrier material is avoided, and the catalyst of the invention has generally higher activity and selectivity;

(3) during the ionizing radiation reduction, the radiation energy is absorbed simultaneously by the carrier and the solution system so that, while the metal ion is reduced to elementary metal, the energy state of the surface of the carrier is also changed, resulting in enhanced interaction between the formed metal particles and the carrier; thus, compared to the conventional methods, the present method provides a catalyst having more uniformly dispersed and more tightly bonded metal particles and better reaction performance;

(4) since in the preparation of the catalyst, conditions such as the kind of the carrier, pH of the impregnating liquid, impregnating time, supporting method, the state of the carrier when irradiated, the kind and content of the free radical scavenger, radiation dose rate, etc. will influence the particle size and distribution of the formed active component particles of the catalyst, it is possible to prepare conveniently catalysts having different characteristics by means of the method of the invention, by adjusting and controlling the above preparation conditions, to meet the requirements of different catalytic reactions;

(5) the method for preparing the catalyst of the invention is simple, and can significantly reduce energy consumption and gaseous pollutant emission, compared to the conventional methods;

(6) the γ-ray, X-ray or electron beam used in the ionizing radiation reduction process according to the invention have strong penetrating ability, and the existing large-scale industrial irradiation sources can be used directly in the production of a mass of a catalyst.

EXAMPLES

The following examples are given for further illustrating the invention, but do not make limitation to the invention in any way.

Example 1

17 ml of solution of $PdCl_2$ in hydrochloride acid having a Pd content of 2 mg/ml was diluted with 30 ml of de-ionized water and then neutralized with 1 N NaOH solution to pH value of 3.0. So-obtained solution was uniformly spray coated on 100 g of $Al_2O_3$ carrier. The carrier was sufficiently wetted with 20 ml of 50% solution of isopropyl alcohol in water, and then irradiated under vacuum with a $^{60}Co$ γ radiation source at a dose rate of 30 Gy/min for 15 h. The irradiated sample was washed with de-ionized water four times, and then dried at 60° C. for 12 hours, to give Catalyst A. Catalyst A has a grey appearance, a Pd content of 0.034 wt %, and an average diameter of Pd particles of 3.3 nm.

Example 2

25 ml of solution of $PdCl_2$ in hydrochloride acid having a Pd content of 2 mg/ml was diluted with 25 ml of de-ionized water and then neutralized with 1 N NaOH solution to pH value of 3.0. 100 g of $Al_2O_3$ carrier was added into the above prepared $PdCl_2$ solution and impregnated for 20 min. Then 10 ml of isopropyl alcohol was added into the impregnation solution, and after uniformly mixed, the resultant mixture was transferred into a test tube. The test tube was stopped and then irradiated with a $^{60}Co$ γ radiation source at a dose rate of 30 Gy/min for 15 h. The irradiated sample was washed with de-ionized water four times, and then dried at 60° C. for 12 hours, to give Catalyst B. Catalyst B has a grey appearance, a Pd content of 0.033 wt %, and an average diameter of Pd particles of 5.4 nm.

Example 3

13.5 ml of solution of $Pd(NO_3)_2$ in nitric acid having a Pd content of 10 mg/ml was diluted with 30 ml of de-ionized water and spray coated on 100 g of $Al_2O_3$ carrier. Then 10 ml of 3N NaOH solution was spray coated on the carrier to fix the palladium salt. The carrier was sufficiently wetted with 20 ml of 50% solution of isopropyl alcohol in water, and then irradiated in $N_2$ atmosphere with a $^{60}Co$ γ radiation source at a dose rate of 60 Gy/min for 8 h. The irradiated sample was dried at 60° C. for 12 h, to give Catalyst C. Catalyst C has an off-white appearance, a Pd content of 0.135 wt %, and an average diameter of Pd particles of 2.9 nm.

Example 4

13.5 ml of solution of $PdCl_2$ in hydrochloride acid having a Pd content of 10 mg/ml and 35 ml of de-ionized water were combined and spray coated on 100 g of $Al_2O_3$ carrier. After drying, 27 ml of $AgNO_3$ aqueous solution having a Ag content of 5 mg/ml and 10 ml of 3N NaOH solution were successively spray coated on the carrier. The carrier was sufficiently wetted with 20 ml of 50% solution of isopropyl alcohol in water, and then irradiated under vacuum with a $^{60}Co$ γ radiation source at a dose rate of 30 Gy/min for 15 h. The irradiated sample was dried at 60° C. for 12 h, to give Catalyst D. Catalyst D has a dark grey appearance, a Pd content of 0.135 wt %, a Ag content of 0.135 wt %, and an average diameter of Pd particles of 3.1 nm.

Example 5

30 ml of solution of $PdCl_2$ in hydrochloride acid having a Pd content of 10 mg/ml was diluted with 10 ml of de-ionized water and then neutralized with 1 N NaOH solution to pH value of 5.0. So-obtained solution was uniformly spray coated on 100 g of $Al_2O_3$ carrier. The carrier was sufficiently wetted with 20 ml of 50% solution of isopropyl alcohol in water, and then irradiated under vacuum with a $^{60}Co$ γ radiation source at a dose rate of 60 Gy/min for 12 h. The irradiated sample was dried at 60° C. for 12 hours, to give Catalyst E. Catalyst E has a black appearance, a Pd content of 0.3 wt %, and an average diameter of Pd particles of 4.7 nm.

Comparative Example 1

17 ml of solution of $PdCl_2$ in hydrochloride acid having a Pd content of 2 mg/ml was diluted with 30 ml of de-ionized water and then neutralized with 1 N NaOH solution to pH value of 3.0. So-obtained solution was uniformly spray coated on 100 g of $Al_2O_3$ carrier. The carrier was dried, calcined at 500° C. for 8 hours to decompose the $PdCl_2$, and then reduced at 150° C. under hydrogen gas flow for 2 h, to give Catalyst F. Catalyst F has a light yellow appearance and a Pd content of 0.034 wt %.

Comparative Example 2

13.5 ml of solution of $PdCl_2$ in hydrochloride acid having a Pd content of 10 mg/ml was diluted with 30 ml of de-ionized water and spray coated on 100 g of $Al_2O_3$ carrier. Then 10 ml of 1N NaOH solution was spray coated on the carrier to fix the palladium salt. The carrier was dried and calcined at 500° C. for 8 hours to decompose the $PdCl_2$, to give Catalyst G. Catalyst G has a yellow appearance and a Pd content of 0.135 wt %.

The above samples were characterized by X-ray photo-electron spectroscopy (XPS), and the results are shown in Table 1 below. The results of XPS show that after the radiation reduction, Catalysts A to E of the Examples have surface $Pd_{3d5/2}$ binding energy below 335.5 eV, indicating that the Pd is present in metal elementary state. Catalysts F and G of the Comparative Examples have surface $Pd_{3d5/2}$ binding energy larger than 336.4 eV, indicating that the Pd is present in oxidized state.

TABLE 1

XPS results of catalysts from the inventive Examples and Comparative Examples

|  | catalyst | BE of $Pd_{3d5/2}$ (eV) | BE of $Pd_{3d3/2}$ (eV) |
| --- | --- | --- | --- |
| Example 1 | A | 335.4 | 340.9 |
| Example 2 | B | 335.3 | 340.8 |
| Example 3 | C | 334.9 | 340.3 |
| Example 4 | D | 334.7 | 340.2 |
| Example 5 | E | 335.4 | 340.8 |
| Comparative Example 1 | F | 336.9 | 342.1 |
| Comparative Example 2 | G | 336.5 | 341.9 |

The dispersion of Pd particles on the surface of the Catalysts C, D, E and G was observed through a transmission electron microscope (TEM), and the results are shown in FIG. 1. The TEM results show that in the Catalysts C, D and E from the Examples, Pd particles are uniformly dispersed on the carrier surface, while in the Catalyst G from the Comparative Example, the Pd particles on the surface exhibit agglomeration and sintering phenomenon.

Example 6

The above Catalysts A, B and F were used in hydrogenation test of a pyrolysis gas from an ethylene plant as follows. 1 ml of each of the catalysts was loaded into a stainless steel tubular reactor with an internal diameter of 7.8 mm. The atmosphere in the reactor was replaced with nitrogen gas, then a feed gas, together with hydrogen gas, was passed through the reactor. The feed gas had a composition by mole of: 36.5% methane, 8% ethane, 38% ethylene, 10% propylene, 0.8% ethyne, 0.4% propyne, 0.2% propadiene, as well as a minor amount of butenes, butadiene, pentanes, and the like, and the hydrogen gas was used in an amount of about 16 mol %, relative to the feed gas. The test was conducted at a space velocity of 10000 $h^{-1}$.

The above catalysts were evaluated with respect to their performance in the selective hydrogenation for ethyne and propyne propadiene (MAPD), and the conversions of hydrogenating ethyne into ethylene and MAPD into propylene as well as corresponding selectivity for individual catalysts at 80° C. are shown in Table 2 below. Ethyne conversion, ethylene selectivity, MAPD conversion, and propylene selectivity are calculated as:

$$C_2H_2 \text{ Conversion} = \frac{(C_2H_2)_{in} - (C_2H_2)_{out}}{(C_2H_2)_{in}} \times 100$$

$$C_2H_2 \text{ Selectivity} = \frac{(C_2H_4)_{out} - (C_2H_4)_{in}}{(C_2H_2)_{in} - (C_2H_2)_{out}} \times 100$$

$$MAPD \text{ Conversion} = \frac{(MAPD)_{in} - (MAPD)_{out}}{(MAPD)_{in}} \times 100$$

$$C_3H_6 \text{ Selectvity} = \frac{(C_3H_6)_{out} - (C_3H_6)_{in}}{(MAPD)_{in} - (MAPD)_{out}} \times 100$$

The experimental results indicate that, for the hydrogenation of ethyne and the hydrogenation of MAPD, at similar olefin selectivity, the catalysts prepared by the method comprising the radiation reduction according to the invention exhibit much higher activities (indicated by the conversions) than those of Comparative Examples.

TABLE 2

Performance of some of the catalysts from Examples and Comparative Examples in catalytic reaction Reaction temperature: 80° C.

| Catalyst | | Ethyne Conversion % | Ethylene Selectivity % | MAPD Conversion % | Propylene Selectivity % |
| --- | --- | --- | --- | --- | --- |
| Example 1 | A | 91.3 | 88.2 | 25.7 | 97.9 |
| Example 2 | B | 64.9 | 89.8 | 13.3 | 99.1 |
| Comparative Example 1 | F | 46.0 | 88.8 | 3.4 | 74.0 |

The above Catalysts C, D and G were used in a side-line evaluation test in a C3 fraction liquid phase selective hydrogenation industrial scale plant. A fixed bed reactor was used, catalyst loading amount was 92 ml, reaction pressure was 2 MPa (gauge), and space velocity was 70 h$^{-1}$. The feed at the reactor inlet comprised 2.3 mol % MAPD, 92.5 mol % propylene, and 5.2 mol % propane. Temperature at reactor inlet and H$_2$/MPAD ratio were adjusted to obtain a selectivity as high as possible, provided that the MAPD was completely removed by the hydrogenation. The calculations of MAPD conversion and propylene selectivity were as described above.

The test results indicate that, for the liquid phase selective hydrogenation of C3 stream, the catalysts prepared by the method comprising the radiation reduction according to the invention exhibit good selectivity and activity, with performance being markedly superior to that of the catalyst of Comparative Examples.

TABLE 3

Performance of some of the catalysts from Examples and Comparative Examples in catalytic reaction

| Catalyst | | Temperature at Inlet ° C. | H$_2$/MAPD mol/mol | Propylene Selectivity % | MAPD Conversion % |
| --- | --- | --- | --- | --- | --- |
| Example 3 | C | 34 | 1.32 | 83.25 | 100 |
| Example 4 | D | 40 | 1.65 | 80.32 | 100 |
| Comparative Example 2 | G | 40 | 1.61 | 45.26 | 100 |

Example 7

5.25 ml of 2 mg/ml solution of Pd(NO$_3$)$_2$ was mixed with 6.0 ml of 3.5 mg/ml solution of AgNO$_3$, and the mixture was uniformly spray coated on 30 g of Al$_2$O$_3$ carrier, followed by the spray coating of 6.0 ml of 0.5N NaOH solution. The carrier was wetted with 10 ml of 50% solution of isopropyl alcohol in water, and then irradiated under vacuum with a $^{60}$Co γ radiation source at a dose rate of 30 Gy/min for 25 h. The irradiated sample was washed with de-ionized water four times and dried at 50° C. for 12 h, to give Catalyst H. Catalyst H has a Pd content of 0.035 wt % and a Ag content of 0.7 wt %.

Example 8

6.0 ml of 3.5 mg/ml solution of AgNO$_3$ was uniformly spray coated on 30 g of Al$_2$O$_3$ carrier. After drying, the carrier was calcined at 550° C. for 8 h to decompose AgNO$_3$. 5.25 ml of 2 mg/ml solution of PdCl$_2$ was adjusted with 1 N NaOH solution to pH 3, and the resultant solution was uniformly spray coated on the Ag-containing carrier. The carrier was wetted with 10 ml of 30% solution of ethylene glycol in water, and then irradiated under vacuum with a $^{60}$Co γ radiation source at a dose rate of 30 Gy/min for 25 h. The irradiated sample was washed with de-ionized water four times and dried at 50° C. for 12 h, to give Catalyst I. Catalyst I has a Pd content of 0.035 wt % and a Ag content of 0.7 wt %.

Example 9

5.25 ml of 2 mg/ml solution of Pd(NO$_3$)$_2$ was mixed with 6.0 ml of 3.5 mg/ml solution of Pb(NO$_3$)$_2$, and the mixture was spray coated on 30 g of Al$_2$O$_3$ carrier, followed by the spray coating of 6.0 ml of 0.5N NaOH solution. The carrier was wetted with 10 ml of 50% solution of isopropyl alcohol in water, and then irradiated under vacuum with a $^{60}$Co γ radiation source at a dose rate of 30 Gy/min for 25 h. The irradiated sample was washed with de-ionized water four times and dried at 50° C. for 12 h, to give Catalyst J. Catalyst J has a Pd content of 0.035 wt % and a Pb content of 0.7 wt %.

Example 10

5.25 ml of 2 mg/ml solution of Pd(NO$_3$)$_2$ was mixed with 3.0 ml of 3.5 mg/ml solution of Ag(NO$_3$)$_2$ and 1.12 ml of 2.70 mg/ml solution of Bi(NO$_3$)$_3$, and the mixture was spray coated on 30 g of Al$_2$O$_3$ carrier, followed by the spray coating of 5.0 ml of 1N NaOH solution. The carrier was wetted with 10 ml of 50% solution of isopropyl alcohol in water, and then irradiated under vacuum with a $^{60}$Co γ radiation source at a dose rate of 30 Gy/min for 40 h. The irradiated sample was washed with de-ionized water four times and dried at 50° C. for 12 h, to give Catalyst K. Catalyst K has a Pd content of 0.035 wt %, a Ag content of 0.035 wt % and a Bi content of 0.01%.

Comparative Example 3

5.25 ml of 2 mg/ml solution of Pd(NO$_3$)$_2$ was mixed with 6.0 ml of 3.5 mg/ml solution of AgNO$_3$, and the mixture was uniformly spray coated on 30 g of Al$_2$O$_3$ carrier. The carrier was dried and then calcined at 550° C. for 8 h, to give Catalyst L. Catalyst L has a Pd content of 0.035 wt % and a Ag content of 0.7 wt %.

Comparative Example 4

Commercial catalyst BC-H-20, available from Beijing Research Institute of Chemical Industry, China Petroleum & Chemical Corporation, was used. The catalyst contained Al$_2$O$_3$ as a carrier, and Pd and Ag as active components, with Pd content being 0.035 wt % and Ag content being 0.7 wt %.

Example 11

The catalysts from Examples 7 to 10 and Comparative Examples 3 to 4 were used in post-hydrogenation simulation experiment of ethylene as follows. 1 ml of each of the catalysts was loaded into a stainless steel tubular reactor with an internal diameter of 7.8 mm. The atmosphere in the reactor was replaced with nitrogen gas, and then a feed gas that simulated an overhead stream from a deethanizer, together with hydrogen gas, was passed through the reactor. The feed gas had a composition by mole of: 7% ethane, 92.64% ethylene, and 0.36% ethyne, and the molar ratio of hydrogen gas to alkyne was 2:1. The test was conducted at a space velocity of 10000 h$^{-1}$.

The catalysts were evaluated with respect to their performance in selective hydrogenation of ethyne, with Catalysts H, I, J and K from the Examples being evaluated directly, and the comparative Catalyst L and BC-H-20 being evaluated after having been reduced in hydrogen gas flow at 150° C. for 2 h. The conversion and selectivity for hydrogenating ethyne to ethylene at 120-130° C. achieved by each of said catalysts are given in Table 4 below. The calculations of the conversion and selectivity of ethylene are as described above.

TABLE 4

Results of post-hydrogenation simulation experiment (averaged over 120-130° C.)

| | Catalyst | Conversion (%) | Selectivity (%) |
|---|---|---|---|
| Example 7 | H | 98.5 | 55.0 |
| Example 8 | I | 98.5 | 62.3 |
| Example 9 | J | 97.5 | 52.3 |
| Example 10 | K | 95.5 | 70.0 |
| Comparative Example 3 | L | 99.0 | 28.2 |
| Comparative Example 4 | BC-H-20 | 99.0 | 38.3 |

Example 12

20 ml of 10 mg/ml solution of Pd(NO$_3$)$_2$ was mixed with 25 ml of 20 mg/ml solution of Cu(NO$_3$), and the mixed solution was spray coated on 100 g of alumina carrier, followed by the spray coating of 10 ml of 3N NaOH solution. 20 ml of 50% solution of isopropyl alcohol in water was added to the carrier having Pd and Cu loaded thereon and uniformly mixed, and then the excess solution was decanted. The mixture was irradiated under vacuum with a $^{60}$Co γ radiation source at a dose rate of 30 Gy/min for 15 h. The irradiated sample was dried at 120° C. for 6 h, to give Catalyst M. Catalyst M has a Pd content of 0.20 wt % and a Cu content of 0.50 wt %, based on the total weight of the catalyst.

Example 13

20 ml of 10 mg/ml solution of Pd(NO$_3$)$_2$ and 10 ml of 10 mg/ml solution of AgNO$_3$ was added into 20 ml distilled water to prepare a mixed solution, and then the mixed solution was spray coated on 100 g of alumina carrier, followed by the spray coating of 10 ml of 3N NaOH solution. 20 ml of 50% solution of isopropyl alcohol in water was added to the carrier having Pd and Ag loaded thereon and uniformly mixed, and then the excess solution was decanted. The mixture was irradiated under vacuum with a $^{60}$Co γ radiation source at a dose rate of 30 Gy/min for 15 h. The irradiated sample was dried at 120° C. for 6 h, to give Catalyst N. Catalyst N has a Pd content of 0.20% and a Ag content of 0.1%, based on the total weight of the catalyst.

Example 14

20 ml of 10 mg/ml solution of Pd(NO$_3$)$_2$, 10 ml of 10 mg/ml solution of Pb(NO$_3$)$_2$ and 20 ml of 10 mg/ml solution of Ca(NO$_3$)$_2$ was mixed, and then the mixed solution was spray coated on 100 g of alumina carrier, followed by the spray coating of 10 ml of 3N NaOH solution. 20 ml of 50% solution of isopropyl alcohol in water was added to the carrier having Pd, Ag and Ca loaded thereon and uniformly mixed, and then the excess solution was decanted. The mixture was irradiated under vacuum with a $^{60}$Co γ radiation source at a dose rate of 30 Gy/min for 15 h. The irradiated sample was dried at 120° C. for 6 h, to give Catalyst O. Catalyst O has a Pd content of 0.20%, a Pb content of 0.1%, and a Ca content of 0.2%, based on the total weight of the catalyst.

Example 15

25 ml of 10 mg/ml solution of Pd(NO$_3$)$_2$ and 5 ml of 10 mg/ml solution of Pb(NO$_3$)$_2$ was added into 20 ml distilled water to prepare a mixed solution, and then the mixed solution was spray coated on 100 g of alumina carrier, followed by the spray coating of 10 ml of 3N NaOH solution. 20 ml of 50% solution of isopropyl alcohol in water was added to the carrier having Pd and Pb loaded thereon and uniformly mixed, and then the excess solution was decanted. The mixture was irradiated under vacuum with a $^{60}$Co γ radiation source at a dose rate of 30 Gy/min for 15 h. The irradiated sample was dried at 120° C. for 6 h, to give Catalyst P. Catalyst P has a Pd content of 0.25% and a Pb content of 0.05%, based on the total weight of the catalyst.

Comparative Example 5

A supported catalyst, Catalyst Q, was prepared according to the method described in Chinese patent CN 1229312C.

Catalyst Q has a Pd content of 0.25% and a Pb content of 0.05%, based on the total weight of the catalyst.

Example 16

Catalysts M, N, O, P and Q prepared in Examples 12 to 15 and Comparative Example 5 were used in hydrogenation experiment of C4 fraction conducted in a fixed bed reactor. The loading amount of the catalysts was 50 ml. Evaluation conditions were as follows: reaction temperature at inlet: 40° C., reaction pressure: 3.0 MPa (absolute), liquid hourly space velocity: 20-30 h$^{-1}$, hydrogen/unsaturated hydrocarbon ratio: 1.5 (mol/mol). The evaluation experiment results are given in Table 5 below.

TABLE 5

Catalyst evaluation experiment results

| Example | Catalyst | Catalyst Composition | LHSV h$^{-1}$ | Alkane Content prior to Hydrogenation, % | Alkane content after Hydrogenation, % |
|---|---|---|---|---|---|
| 12 | M | Pd 0.2% Cu 0.5% | 26 | 70.32 | >99 |
| 13 | N | Pd 0.2% Ag 0.1% | 28 | 70.76 | >99 |
| 14 | O | Pd 0.2% Pb 0.1% Ca 0.2% | 30 | 70.03 | >99 |
| 15 | P | Pd 0.25% Pb 0.05% | 28 | 70.28 | >99 |
| Comparative Example 5 | Q | Pd 0.25% Pb 0.05% | 20 | 72.21 | >99 |

The evaluation experiment results show that, compared to the supported catalyst prepared by the conventional method, the catalysts according to the invention prepared by means of radiation reduction process exhibit higher catalytic activity in the olefin hydrogenation and can be operated at higher olefin load. In order to achieve the same hydrogenation effect, the catalysts according to the invention may be used at markedly reduced amount and contain markedly reduced amount of noble metal, compared to the catalyst prepared by the conventional method.

Example 17

70 ml aqueous solution of PbCl$_2$ having a Pd content of 0.36 wt % and a pH value of 4.0 was prepared (during the preparation, 1N NaOH solution was used to adjust the pH value). The above PbCl$_2$ solution was spray coated on 100 g of alumina carrier. After left in stand for 20 min, a solution prepared from 20 ml of de-ionized water and 20 ml of isopropyl alcohol was poured on the carrier having Pd supported thereon. After uniformly mixing, the excess solution was decanted. The remaining mixture was irradiated under vacuum with a $^{60}$Co γ radiation source at a dose rate of 30 Gy/min for 15 h. The irradiated sample was dried at 120° C. for 6 h, to give Catalyst S. Catalyst S has a Pd content of 0.25 wt %.

Example 18

70 ml aqueous solution of PbCl$_2$ having a Pd content of 0.36 wt % and a pH value of 4.0 was prepared (during the preparation, 1N NaOH solution was used to adjust the pH value). The above PbCl$_2$ solution was spray coated on 100 g of alumina carrier. After air drying, the carrier was dried in an oven at 120° C. for 24 h. 70 ml Pb(NO$_3$)$_2$ solution having a Pb content of 0.72 wt % was prepared and spray coated on the alumina carrier containing Pd. After left in stand for 20 min, a solution prepared from 20 ml of water and 20 ml of isopropyl alcohol was added to the carrier containing Pd. After uniformly mixing, the excess solution was decanted. The remaining mixture was irradiated under vacuum with a $^{60}$Co γ radiation source at a dose rate of 30 Gy/min for 15 h. The irradiated sample was dried at 120° C. for 6 h, to give Catalyst T. Catalyst T has a Pd content of 0.25 wt % and a Pb content of 0.50 wt %.

Example 19

Catalyst U was prepared by a procedure similar to that described in Example 18, which has a Pd content of 0.25 wt % and a Sn content of 0.40 wt %.

Example 20

Catalyst V was prepared by a procedure similar to that described in Example 18, which has a Pd content of 0.25 wt %, a Sn content of 0.40 wt % and a Mg content of 2.0 wt %.

Comparative Example 6

70 ml aqueous solution of PbCl$_2$ having a Pd content of 0.43 wt % and a pH value of 4.0 was prepared (during the preparation, 1N NaOH solution was used to adjust the pH value). The above PbCl$_2$ solution was spray coated on 100 g of alumina carrier. After air drying, the spray coated carrier was dried in an oven at 120° C. for 24 h. The resultant product was calcined at 450° C. for 8 h to decompose PdCl$_2$, and then reduced in hydrogen flow at 150° C. for 2 h, to give Comparative Catalyst W, which has a Pd content of 0.30 wt %.

Example 21

100 ml of each of Catalysts S, T, U, V and W prepared in Examples 17 to 20 and Comparative Example 6 was used in hydrogenation experiment of C6-C8 middle distillate of pyrolysis gasoline conducted in an adiabatic bed reactor. The middle distillate used in the experiment had a diene value of 36 g iodine/100 g oil and a gum content of less than 60 mg/100 ml oil. Reaction conditions were as follows: hydrogen pressure: 2.8 MPa (absolute); temperature at inlet: 45° C.; volume ratio of hydrogen to oil: 50:1; space velocity of total feed: 8 h$^{-1}$. The diene value of the oil was measured by malic anhydride method. The evaluation results when the reaction had been conducted for 100 h are shown in Table 6 below.

TABLE 6

Performance of inventive catalysts and comparative catalyst in hydrogenation of pyrolysis gasoline

| Catalyst | S | T | U | V | W |
|---|---|---|---|---|---|
| Diene value of product after hydrogenation (g iodine/100 g oil) | 0.78 | 0.50 | 0.42 | 0.06 | 3.40 |

Example 22

Contrastive evaluations of hydrogenation performance at relatively large space velocity were conducted by using Catalyst V and comparative Catalyst W in a 100 ml adiabatic bed reactor. The feed used in the evaluations was a C6-C8 middle distillate of pyrolysis gasoline having a diene value of 36 g iodine/100 g oil and a gum content of less than 60 mg/100 ml oil. Reaction conditions were as follows: hydrogen pressure: 2.8 MPa; reaction temperature: 45° C.; volume ratio of hydrogen to oil: 50:1; fresh oil space velocity: 8 h$^{-1}$; recycling ratio: 2:1; total space velocity: 24 h$^{-1}$. The diene value of the oil was measured by malic anhydride method. The evaluation results when the reaction had been conducted for 100 h and 500 h are shown in Table 7 below.

TABLE 7

Hydrogenation performance of Catalyst V and comparative Catalyst W at relatively large space velocity

|  |  | Catalyst V | Comparative Catalyst W |
|---|---|---|---|
| Diene value of product after hydrogenation (g iodine/100 g oil) | 100 h | 0.09 | 3.56 |
|  | 500 h | 0.81 | 7.34 |

Example 23

100 ml of each of Catalysts S, T, U and V prepared in Examples 17 to 20 was used in catalyst activity and selectivity evaluation experiment conducted in an adiabatic bed reactor. The feed used in the evaluations was a C6 to C8 middle distillate of pyrolysis gasoline having a diene value of 14.11 g iodine/100 g oil, an iodine value of 43.35 iodine/100 g oil, and a gum content of less than 60 mg/100 ml oil. Reaction conditions were as follows: reaction pressure: 2.8 MPa; reactor temperature at inlet: 40° C.; volume ratio of hydrogen to oil: 80:1; fresh oil space velocity: 8 h$^{-1}$. The experimental results are shown in Table 8 below.

TABLE 8

Hydrogenation performance of catalysts from Examples 17 to 20

| Item | Catalyst S | Catalyst T | Catalyst U | Catalyst V |
|---|---|---|---|---|
| Diene value of product (g iodine/100 g oil) | 0.81 | 0.60 | 0.48 | 0.02 |
| Iodine value of product (g iodine/100 g oil) | 23.40 | 21.36 | 22.91 | 22.31 |

The patents, patent applications and testing methods cited in the specification are incorporated herein by reference.

While the invention has been described with reference to exemplary embodiments, it will be understood by those skilled in the art that various changes and modifications may be made without departing from the spirit and scope of the invention. Therefore, the invention is not limited to the particular embodiments disclosed as the best mode contemplated for carrying out this invention, but the invention will include all embodiments falling within the scope of the pended claims.

What is claimed is:

1. A method for preparation of a supported metal catalyst, comprising applying ionizing radiation on a system comprising a precursor of a primary metal active component, a carrier, a free radical scavenger and water, to reduce at least the primary metal active component precursor into the primary metal active component in elementary state, wherein the step of applying the ionizing radiation to carry out the reduction is conducted in either of the following manners:
   a) wetting the carrier having the primary metal active component precursor supported thereon with an aqueous solution comprising the free radical scavenger, and then irradiating the wetted carrier; or
   b) mixing the carrier having the primary metal active component precursor supported thereon with an aqueous solution comprising the free radical scavenger, and then irradiating the carrier immersed in the solution,
   wherein the catalyst comprises a carrier and supported thereon a primary metal active component and an optional secondary metal active component,
   wherein the primary metal active component is one of the elements of Group VIII and Group IB,
   wherein prior to either the wetting step or the mixing step, the carrier having the primary metal active component precursor supported thereon is treated with a fixing agent, which is a basic compound.

2. The method of claim 1, wherein the ionizing radiation used is γ-ray, X-ray or electron beam.

3. The method of claim 1, wherein the ionizing radiation used has an adsorption dose rate of from 1 to $1\times10^7$ Gy/min, and wherein the ionizing radiation used has an adsorption dose of from 0.01 to $1\times10^5$ kGy.

4. The method of claim 1, wherein the primary metal active component precursor is a corresponding compound of the primary metal active component, which is chosen from chlorides, nitrated, acetates, sulfates and organic metallic compounds.

5. The method of claim 1, wherein the free radical scavenger is at least one chosen from alcohols and formic acid.

6. The method of claim 5, wherein the free radical scavenger is chosen from methanol, ethanol, ethylene glycol, isopropyl alcohol and formic acid.

7. The method of claim 1, further comprising supporting a secondary metal active component or a precursor thereof on the carrier, before, during, or after the ionizing radiation reduction.

8. The method of claim 1, wherein the carrier is chosen from $Al_2O_3$, $SiO_2$, $TiO_2$, MgO, diatomite, molecular sieves, clays and mixtures thereof.

9. The method of claim 1, wherein the irradiating of the wetted carrier is carried in vacuum or under inert atmosphere.

10. The method of claim 1, wherein the fixing agent is chosen from an aqueous solution of sodium hydroxide, potassium hydroxide, sodium bicarbonate, sodium carbonate, and ammonia water.

* * * * *